United States Patent
Tzannes

(10) Patent No.: US 6,748,016 B1
(45) Date of Patent: Jun. 8, 2004

(54) SYSTEM AND METHOD FOR TRANSMITTING MESSAGES BETWEEN TRANSCEIVERS USING ELECTROMAGNETICALLY COUPLED SIGNALS

(75) Inventor: Marcos C. Tzannes, Orinda, CA (US)

(73) Assignee: Aware, Inc., Bedford, MA (US)

(*) Notice: Subject to any disclaimer, the term of this patent is extended or adjusted under 35 U.S.C. 154(b) by 721 days.

(21) Appl. No.: 09/616,954

(22) Filed: Jul. 14, 2000

Related U.S. Application Data

(60) Provisional application No. 60/144,562, filed on Jul. 16, 1999.

(51) Int. Cl.[7] .................................................. H04B 1/10
(52) U.S. Cl. ........................ 375/227; 375/219; 379/417
(58) Field of Search ................................. 375/219, 227; 379/417

(56) References Cited

U.S. PATENT DOCUMENTS

| | | | |
|---|---|---|---|
| 3,573,380 A | | 4/1971 | Darlington .................... 179/15 |
| 3,655,920 A | * | 4/1972 | Laane ......................... 379/292 |
| 4,057,691 A | * | 11/1977 | Goto et al. .................. 379/292 |
| 4,131,766 A | | 12/1978 | Narasimha .................... 179/15 |
| 4,568,156 A | | 2/1986 | Dane .......................... 350/632 |
| 4,679,227 A | | 7/1987 | Hughes-Hartogs ........... 379/98 |
| 4,731,816 A | | 3/1988 | Hughes-Hartogs ........... 379/98 |
| 4,802,190 A | | 1/1989 | Schouhamer Immink .... 375/38 |
| 4,912,763 A | | 3/1990 | Galand et al. ................ 381/31 |
| 5,048,054 A | | 9/1991 | Eyuboglu et al. .............. 375/8 |
| 5,128,964 A | | 7/1992 | Mallory ....................... 375/39 |
| 5,181,198 A | * | 1/1993 | Lechleider .................. 370/286 |
| 5,206,886 A | | 4/1993 | Bingham ..................... 375/97 |
| 5,285,474 A | | 2/1994 | Chow et al. .................. 375/13 |
| 5,327,574 A | | 7/1994 | Monma et al. ............. 455/33.2 |
| 5,400,322 A | | 3/1995 | Hunt et al. ................... 370/19 |
| 5,428,790 A | | 6/1995 | Harper et al. ............... 395/750 |
| 5,452,288 A | | 9/1995 | Rahuel et al. ................ 370/19 |

(List continued on next page.)

FOREIGN PATENT DOCUMENTS

| | | | | |
|---|---|---|---|---|
| DE | 19624928 A1 | 1/1998 | ............ | H04B/3/32 |
| EP | 0473465 A1 | 3/1992 | ............ | H04M/1/72 |

(List continued on next page.)

OTHER PUBLICATIONS

John A. C. Bingham, "Multicarrier Modulation for Data Transmission: An Idea Whose Time Has Come" May 1990 IEEE Communications Magazine pp. 5–14.

*Primary Examiner*—Stephen Chin
*Assistant Examiner*—Sudhanshu C. Pathak
(74) *Attorney, Agent, or Firm*—Miles & Stockbridge P.C.; Jason H. Vick

(57) ABSTRACT

A communication system and method for communicating over a wire in a group of wires are described. The communication system includes a first transceiver connected to a first wire in the group of wires and a second transceiver connected to a second wire in the group of wires. Although not directly connected by a wire, the transceivers communicate with each other using electromagnetically coupled signals. For example, the first transceiver transmits signals over the first wire that produce interference on the second wire. The second transceiver detects the interference on the second wire and transmits a communication signal over the second wire that electromagnetically couples to the first wire. The electromagnetically coupled signal conveys a message to the first transceiver that induces the first transceiver to produce a response. The message directs the first transceiver to take an action that adjusts the produced interference. The communication signal has a predefined frequency and phase characteristic that causes the first transceiver to recognize the message.

7 Claims, 4 Drawing Sheets

U.S. PATENT DOCUMENTS

| | | | |
|---|---|---|---|
| 5,479,447 A | | 12/1995 | Chow et al. ................. 375/260 |
| 5,483,551 A | * | 1/1996 | Huang et al. ................ 375/219 |
| 5,497,398 A | | 3/1996 | Tzannes et al. ............. 375/260 |
| 5,521,906 A | | 5/1996 | Grube et al. .................. 370/17 |
| 5,530,724 A | * | 6/1996 | Abrams et al. ............. 375/345 |
| 5,533,008 A | | 7/1996 | Grube et al. .................. 370/17 |
| 5,548,222 A | * | 8/1996 | Jensen et al. ............... 324/628 |
| 5,555,244 A | | 9/1996 | Gupta et al. ................ 370/60.1 |
| 5,574,273 A | * | 11/1996 | Nakagawa et al. ......... 235/492 |
| 5,596,604 A | | 1/1997 | Cioffi et al. ................. 345/260 |
| 5,598,435 A | | 1/1997 | Williams .................... 375/261 |
| 5,636,246 A | | 6/1997 | Tzannes et al. ............. 375/260 |
| 5,812,599 A | | 9/1998 | Van Kerckhove ........... 375/260 |
| 5,887,032 A | * | 3/1999 | Cioffi ......................... 375/257 |
| 6,002,247 A | * | 12/1999 | Watkins ........................ 324/66 |
| 6,205,220 B1 | * | 3/2001 | Jacobsen et al. ............ 379/417 |
| 6,236,726 B1 | * | 5/2001 | Darveau ..................... 379/417 |
| 6,339,613 B2 | * | 1/2002 | Terry .......................... 375/227 |

FOREIGN PATENT DOCUMENTS

| | | | |
|---|---|---|---|
| EP | 0652677 A2 | 5/1995 | ............ H04N/7/24 |
| EP | 0652677 A3 | 3/1996 | ............ H04N/7/24 |
| EP | 0703685 A2 | 3/1996 | ............ H04L/1/18 |
| EP | 0762701 A2 | 3/1997 | ............ H04L/27/26 |
| EP | 0812087 A2 | 12/1997 | ............ H04L/27/26 |
| EP | 0820168 A2 | 1/1998 | ............ H04L/5/14 |
| EP | 0840474 A2 | 5/1998 | ............ H04L/5/14 |
| EP | 0905948 A2 | 3/1999 | ............ H04L/27/26 |
| WO | 97/15131 | 4/1997 | ............ H04L/1/12 |
| WO | 98/06186 | 2/1998 | ............ H04B/3/32 |
| WO | 98/27665 | 6/1998 | ............ H04B/1/38 |
| WO | 98/57472 | 12/1998 | ............ H04L/27/26 |
| WO | 99/16224 | 4/1999 | ............ H04L/27/26 |
| WO | 99/18701 | 4/1999 | ............ H04L/27/00 |

* cited by examiner

SYSTEM AND METHOD FOR TRANSMITTING MESSAGES BETWEEN TRANSCEIVERS USING ELECTROMAGNETICALLY COUPLED SIGNALS

RELATED APPLICATION

This application claims the benefit of the filing date of U.S. Provisional Application, Serial No. 60/144,562, filed Jul. 16, 1999, entitled "Inter-Telephone Wire Communication Via Electromagnetically Coupled Signals," the entirety of which provisional application is incorporated by reference herein.

FIELD OF THE INVENTION

The invention relates in general to communications, and more specifically to a method and system for communicating between transceivers using electromagnetically coupled signals.

BACKGROUND OF THE INVENTION

Standard telephone wire connections between homes and telephone central offices are configured in binder groups with ten to fifty twisted pair wires per binder group. Binder groups are combined to form multi-pair cables that can have from ten to several thousand twisted pairs. These multi-pair cables have a metallic electrical sheathing and plastic covering that shield the twisted pairs from most noise and other disturbances that exist outside of the binder group in the air or underground. As a result, the twisted pair binder group is a transmission environment that can be significantly impacted by noise resulting from signals that are transmitted on one twisted pair leaking, or "crosstalking", into another twisted pair in the same binder group via electromagnetic energy coupling. The unwanted electromagnetic energy that couples into a twisted pair from signals transmitted on other pairs in the same binder group is called crosstalk noise, or simply "crosstalk". In most cases, this crosstalk is one of the limiting factors for the performance of all the transmission systems that are contained in a particular binder group. When crosstalk is the primary factor, the transmission environment is called a crosstalk-limited environment. One of the most problematic types of crosstalk for communicating data over telephone wires is near-end crosstalk, which is crosstalk that results from transmitters that are "near" the receiver, i.e., at the same end of the wire. For example, near-end crosstalk for a receiver in a home (customer premise, CP) originates from other neighboring homes' transmitters. This crosstalk is typically the most severe type because in this case the transmitter is closest to the receiver and therefore the magnitude of the crosstalk can be large.

One technique for decreasing the levels of near-end crosstalk in the telephone binder group transmission environment is by maintaining frequency separation between the receiving signal and the near-end crosstalking signal. In general, techniques or processes that are intended to decrease the levels of crosstalk in multi-pair metallic loop cables are known as "spectrum management" plans. The American National Standards Institute (ANSI) is currently drafting an American Standard on Spectrum Management called "Spectrum Management for Loop Transmission Systems". This standard will, among other things, set rules on which frequency bands transceivers should use depending on whether they are located at the CP or the central office (CO). By implementing a spectrum management plan that dictates the frequency bands for transmission from the CO to the CP (downstream transmission) and separate frequency bands for transmission from the CP to the CO (upstream direction), one can significantly decrease the near-end crosstalk in the binder group.

Telephone companies intend to establish spectrum management plans based on the ANSI standard for their loop plant for this reason. However, even though such companies hope to enforce the rules of such a plan on new transceivers deployed in their network, little can be done about older "legacy" systems that may not follow these rules.

Furthermore, the spectrum compatibility problem is more complicated because in some homes people use their in-home telephone wiring for other transmission systems. One example of an in-home wiring transmission system is a home computer networking system that is used to connect multiple computer devices in people's homes. This transmission system, also known as home phone networking (HPN), does not follow the spectrum management rules that the telephone companies want to use in their network. As a result, HPN signals that "leak" from homes onto the telephone network become a severe near-end crosstalk source for many telephone company-deployed services. This problem of spectrum pollution from signals that do not follow the spectrum management rules is serious and affects the availability of high-speed data access to homes and businesses. Thus, there remains a need for a system and method that can reduce the crosstalk interference encountered by transceivers communicating on wires in a binder group.

SUMMARY OF THE INVENTION

In one aspect, the invention features a method for use by a transceiver to communicate over a wire in a group of wires. In the method, communications are received over a first wire and transmits a communication signal over the first wire. The communication signal transmitted over the first wire electromagnetically couples to a second wire to produce an electromagnetically coupled signal on the second wire. The electromagnetically coupled signal conveys a message that induces a response from a second transceiver connected to the second wire.

The conveyed message directs the second transceiver to alter an operation of the second transceiver. More specifically, one embodiment of the method detects interference on the communications received over the first wire and the transmission of the communication signal occurs in response to detecting the interference. The transmission of the communication signal occurs if the detected interference exceeds a predetermined threshold. In a further embodiment, the detected interference is crosstalk.

In another aspect, the invention features a method for communicating between a first and second transceiver that are connected to different wires in a group of wires. The first and second transceivers are not connected to each other by any wire in the group of wires. One embodiment of the method transmits signals by a first transceiver over a first wire. The first transceiver receives a communication signal over the first wire. The communication signal is transmitted from a second transceiver over a second wire and is electromagnetically coupled to the first wire from the second wire. The method further includes performing an action in response to a message conveyed by the electromagnetically coupled communication signal.

In one embodiment, the performed action is an adjustment to a transmission parameter. The adjustment changes a power level used to transmit signals over the first wire. In another embodiment, the adjustment changes a frequency band used to transmit signals over the first wire. In yet another embodiment, the adjustment changes time increments used to transmit signals over the first wire.

In a further embodiment, the method includes receiving a second electromagnetically coupled signal over the first wire in response to the adjustment to a transmission parameter. The adjustment of the transmission parameter is stopped in response to the second electromagnetically coupled signal.

DESCRIPTION OF THE DRAWINGS

The aspects of the invention presented above and many of the accompanying advantages of the present invention will become better understood by referring to the included drawings, in which.

DETAILED DESCRIPTION OF THE INVENTION

Figure 1:
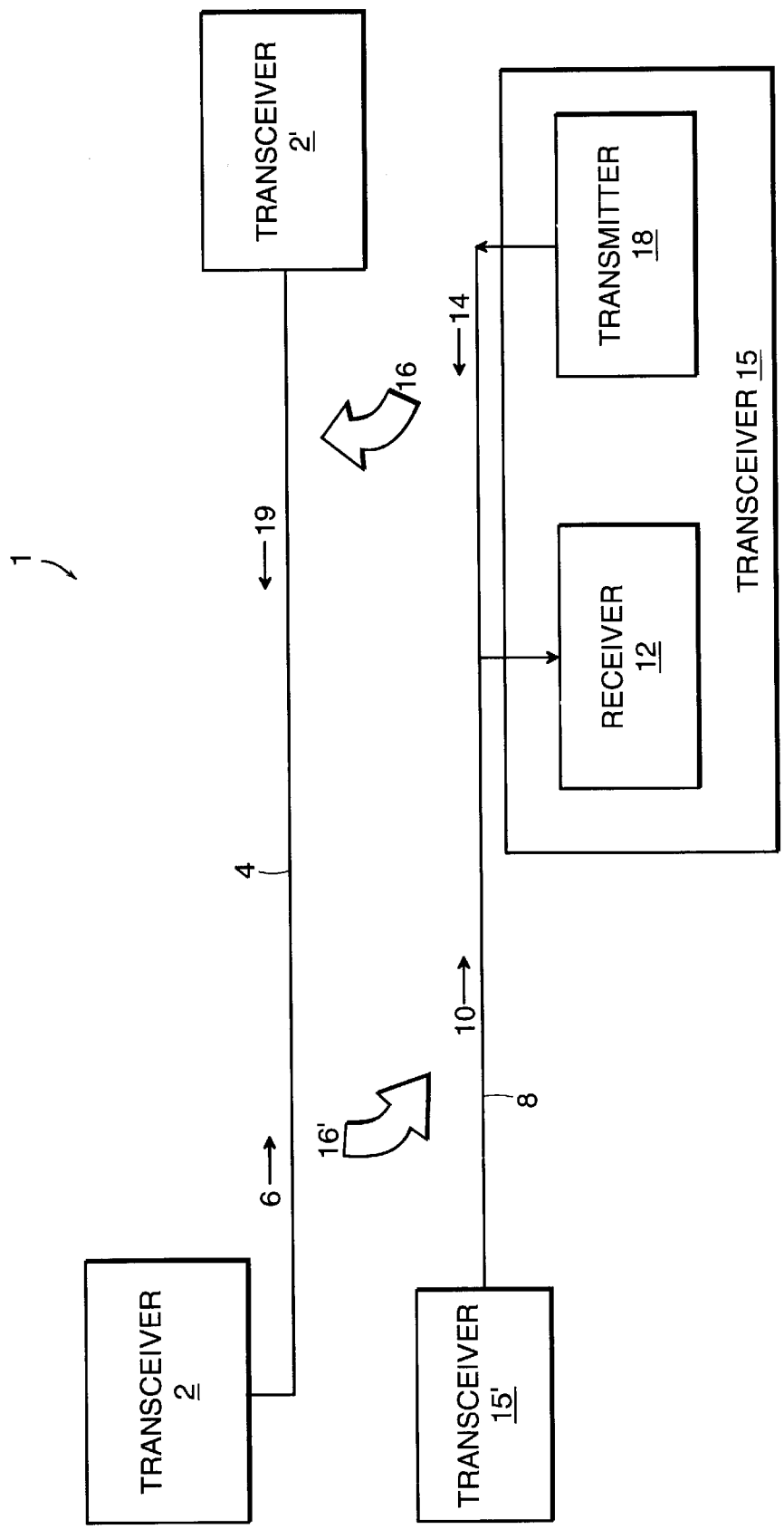
FIG. 1 is a diagram illustrating an embodiment of a communication system in which communication occurs between a two transceivers using electromagnetically coupled signals.

FIG. 1 shows a communication system 1 embodying the principles of the invention. The communication system 1 includes a first transceiver 2 in electrical communication with another transceiver 2' over a first communication channel 4 and a second transceiver 15 in electrical communication with another transceiver 15' over a second communication channel 8. Representative of each transceiver shown, the second transceiver 15 includes a receiver 12 and a transmitter 18. The first communication channel 4 is within physical aproximity of the second communication channel 8 such that signals traversing either of the communication channels 4, 8 can electromagnetically couple to the other communication channel. In one embodiment, the communication channels 4, 8 are separate twisted pair telephone wires within a single binder group.

In brief overview, the second transceiver 15 uses the fact that signals traversing one twisted pair in a binder group can electromagnetically couple into other twisted pairs in the same binder group to send messages to other transceivers (e.g., transceiver 2) connected to those other twisted pairs. Such communication is hereafter referred to as "inter-telephone wire communication". It is to be understood that the wires 4, 8 do not need to be within a single binder group to practice the principles of the invention. It is sufficient that the wires 4, 8 be within physical proximity of each other to enable the signals to electromagnetically couple from one wire to the other.

Inter-telephone wire communication can be employed for a variety of purposes. One purpose, for example, is to decrease crosstalk in a binder group. During operation of the communication system 1, the transceiver 2 transmits information 6, or signal transmissions, over the first communication channel 4 to communicate with the transceiver 2'. These signal transmissions 6 electromagnetically couple (arrow 16') to the second communication channel 8. The electromagnetically coupled signal transmissions 10 may interfere with communications exchanged over the second communication channel 8 between the transceivers 15, 15'. If the transceiver 2 is near the transceiver 15 (e.g., at the same end of a binder group), the interference manifests as near-end crosstalk, described above. Similarly, signals originating from the transceiver 2' and transmitted over the communication channel 4 can also induce such interference on the second communication channel 8.

The receiver 12 of transceiver 15, which is connected to the second communication channel 8, receives the electromagnetically coupled signal transmissions 10 and determines whether the interference caused by electromagnetically coupled signal transmissions 10, if any, is above a predetermined threshold. If the interference is above the predefined threshold, the transmitter 18 transmits a signal 14 over the second communication channel 8. In accordance with the principles of the invention, this signal 14 provides a message that is understood by the transceiver 2.

Although the transceivers 2, 15 are physically connected to separate communication channels 4, 8, respectively, the present invention enables the transceiver 15 to send messages to transceiver 2. This communication occurs because the signal 14 that is transmitted on one communication channel (here, communication channel 8) creates an electromagnetic field that surrounds nearby communication channels (e.g., communication channel 4) and induces voltages into the nearby communication channel (e.g. communication channel 4). The electromagnetic coupling is designated in FIG. 1 as arrow 16. The signal 14 is electromagnetically coupled onto the first communication channel 4 to produce a corresponding electromagnetically coupled message 19. Although the induced voltages are normally viewed as harmful interference, the electromagnetically coupled message 19 is produced for the specific purpose of communicating with the source of the interference (here, transceiver 2) and therefore is not considered harmful.

Note that the signal 14 can electromagnetically couple to a plurality of wires and that each transceiver connected to such a wire can receive the message 19. The message 19 requests that each receiving transceiver (e.g., the transceiver 2) take appropriate actions to adjust the interference 10 that the transceiver 2 is producing. Typically, the request is to adjust a transmission characteristic that reduces the interference, but in other embodiments, the message 19 could be sent for other purposes, e.g., to make adjustments that increase the interference. Further, any communications via the electromagnetically coupled message 19 to the transceiver 2 from a transmitter 18 is within the scope of the present invention. For example, in another embodiment the message 19 is created to identify or exchange characteristics of the transmission or service between the transceivers 2, 15. In yet another embodiment, the transceiver 15 issues the signal 14 (and corresponding electromagnetically coupled message 19) to send data to the transceiver 2.

Figure 2:
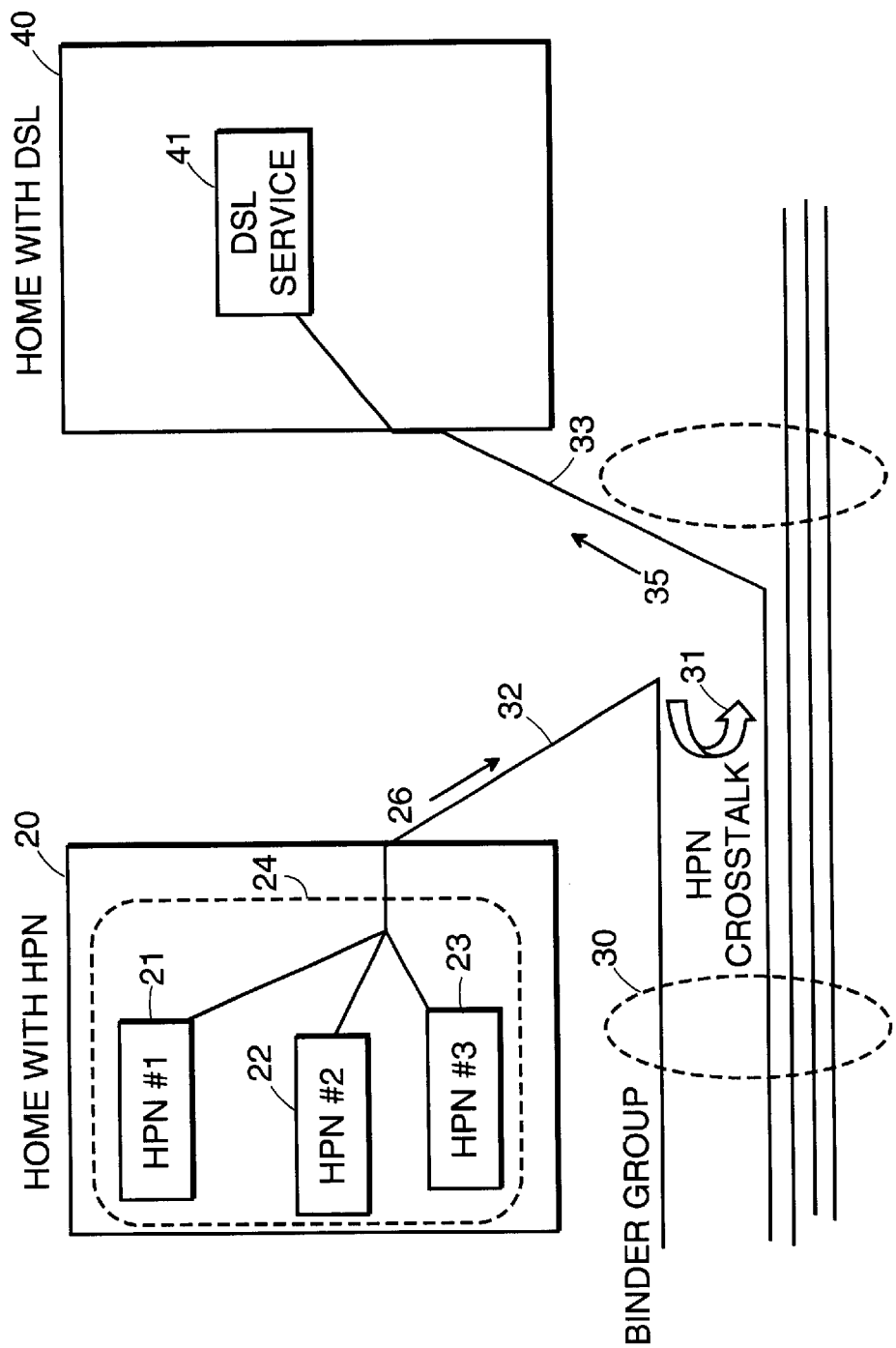
FIG. 2 is a diagram illustrating an embodiment of a HPN network inducing interference into digital subscriber line (DSL) transceiver connection.

FIG. 2 shows an embodiment of the communication system I shown in FIG. 1 that includes a home phone networking (HPN) system and a DSL system (ADSL, SDSL, VDSL or the like). DSL services are typically offered by telephone companies and provide high speed data connections between a central office (CO) and homes and businesses. These DSL services follow spectrum management rules, described above, in order to decrease crosstalk in the loop. HPN systems are in commercially available consumer personal computers (PCs). Such HPN systems generally do not follow the spectrum management rules and therefore generate high levels of crosstalk in the telephone network environment. In FIG. 2, the HPN system generates near-end crosstalk that affects the DSL system as described below.

In more detail, a home 20 includes a home phone network (HPN) 24, which has several HPN transceivers 21, 22, 23 (generally 21) that communicate with each other. The HPN 24 is also connected to a twisted pair of telephone wires 32. A second home 40 includes a DSL (e.g., DSL, ADSL, SDSL, VDSL, etc.) device 41 that communicates over a twisted pair of telephone wires 33 with a central office (CO), not shown. ADSL transceivers have been standardized by ANSI in the T1.413 standard and by the International Telecommunications Union (ITU) in the G.992.1 and G.992.2 standards and the ITU is currently standardizing SDSL and VDSL systems in projects called G.vdsl and G.shsdl.

Both twisted pairs 32, 33 are part of a binder group 30, which houses a plurality of twisted pair telephone wires. The HPN transceivers 21 transmit HPN signals 26 that exit the home 20 onto the twisted pair 32 and leak onto the other wires in the binder group 30 as crosstalk noise (shown as HPN crosstalk 31). The crosstalk 31 introduces an electromagnetically coupled interference signal 35 over the twisted pair 33. The DSL device 41 subsequently receives this interference signal 35. The reception of the interference signal 35 typically causes a decrease in the DSL service provided by the DSL device 41. It should be noted that the interference signal 35 may not degrade the performance of the DSL device 41. Still, the interference signal 35 is unwanted and is not recognized by the DSL device 41 as an expected signal. Therefore, the DSL device 41 uses inter-telephone wire communications described above in FIG. 1 to communicate to the home 20 with the HPN 24. Again, as noted above, inter-telephone wire communication uses the fact that signals transmitted on one twisted pair in a binder group electromagnetically couple to other twisted pairs in the same binder group.

Figure 3:
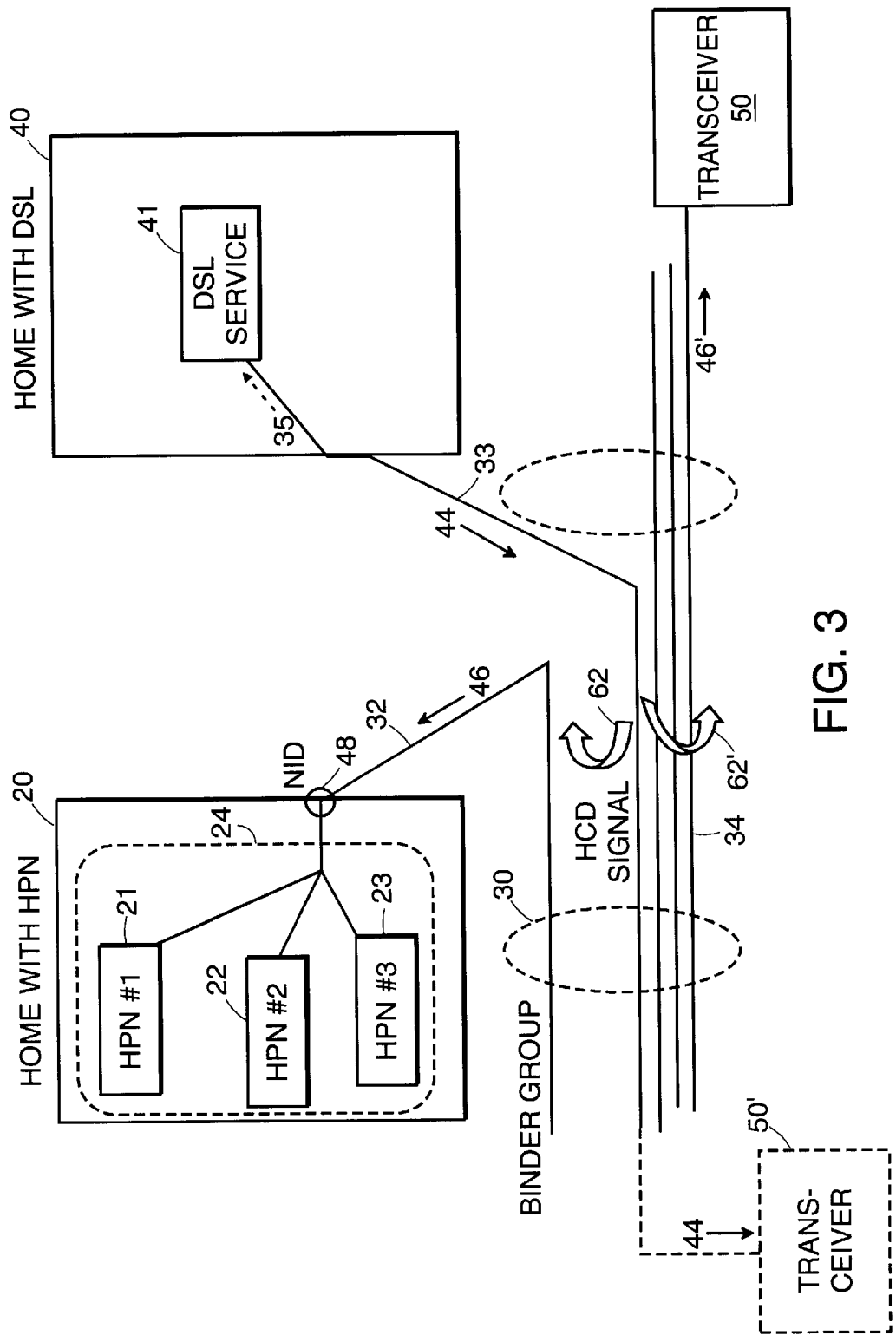
FIG. 3 is a diagram illustrating an embodiment of a DSL transceiver using electromagnetically coupled signals to communicate with HPN devices that are interfering with the communications of the DSL transceiver.

FIG. 3 shows the DSL transceiver 41 communicating with the HPN transceivers 21 via an electromagnetically coupled signal. Upon reception of the interference signal 35 (shown as shadow 35), the DSL device 41 determines if the interference signal 35 is above a predetermined threshold. In one embodiment, the DSL device 41 makes this determination based on the amplitude of the interference signal 35. In another embodiment, the DSL device 41 bases this determination on the effect that the interference signal 35 has on subsequent output. In yet another embodiment, the DSL device 41 looks at the signal-to-noise ratio to aid in the determination.

In still yet another embodiment, the DSL device 41 determines if the interference signal 35 is at an acceptable level based on the current operational status of the DSL device 41. In other words, the DSL device 41 varies the predetermined threshold as the type or importance of its communications varies. For example, if the DSL device 41 is idle except for receiving the interference signal 35 (or any interference), the predetermined threshold can be set to a relatively high value compared to the predetermined threshold when the DSL device 41 is involved in a communication with another device. This enables the transceivers 21 to operate without interruption from the DSL device 41 if the DSL device 41 is not actively engaged in communication. Different levels of operational status can be incorporated into the DSL device 41 to allow for variable predetermined thresholds, such as separate thresholds corresponding to when the DSL device 41 is inactive or when the DSL device 41 is performing a self-check.

If the interference signal 35 exceeds the predetermined threshold, the DSL device 41 transmits a High Crosstalk Detection (HCD) signal 44 on the twisted pair 33. The purpose of the HCD signal 44 is to request that the HPN transceivers 21 adjust their transmissions so as to reduce or eliminate the interference signal 35 that the HPN transceivers 21 are producing. In another embodiment, the HCD signal 44 has multiple purposes including the adjustment of the interference signal 35. The HCD signal 44 can have a purpose not related to interference in general or to the interference signal 35 in particular. Similar to the electromagnetic coupling of the crosstalk 31 but in the opposite direction, the HCD signal 44 is electromagnetically coupled onto the twisted pair 32, as shown with the HCD signal arrow 62. The electromagnetic coupling of the HCD signal 44 introduces an electromagnetically coupled signal 46. The HPN transceivers 21 then receive the electromagnetically coupled signal 46.

The HCD signal 44 is a known signal (i.e., a message understood by the HPN transceivers 21) with predefined characteristics so that the HCD transceivers 21 can easily distinguish the HCD signal 46 from plain crosstalk noise as well as other signals. In one embodiment, the HCD signal 44 is a tone at 7.5 MHz, which is the center frequency of the HCD signal 44 transmission. Other frequencies can be used to practice the invention. In general, the selected tone frequency depends on the type of transceivers with which the transceiver 15 wishes to communicate. The HCD signal 44 can also be modulated with a known technique such as binary-phase shift keying (BPSK), with alternating 180-degree phase shifts. Similarly, the HCD signal 44 can be modulated with a technique such as frequency-shift keying (FSK), with a different frequency corresponding to each binary value.

The electromagnetically coupled signal 46 appears as a form of crosstalk to the HCN transceivers 21 because the electromagnetically coupled signal 46 was electromagnetically coupled onto the twisted pair 32 from another transmission source (here, the DSL device 41) on a distinct communication channel 33. However, each HPN transceivers 21 is configured to recognize a signal having the predefined characteristics, such as phase and frequency, described above as a predefined message. For example, upon detecting the electromagnetically coupled signal 46, the HPN transceivers 21 perform an action that in effect adjusts the amount of crosstalk 31 that is being electromagnetically coupled onto the twisted pair 33.

In addition to electromagnetically coupling onto the twisted pair 32, the HCD signal 44 can also couple onto other twisted wire pairs in the binder group 30 and be received by other transceivers. For example, if a transceiver 50 (shown in shadow) is connected to another twisted wire pair 34 in the binder group 30, that transceiver 50 also receives an HCD signal 46' by the electromagnetic coupling 62' of the signal 44 onto that twisted pair 34. The transceiver 50 may recognize and respond to the HCD signal 46' just as the HPN transceivers 21 recognize and respond to the HCD signal 46.

The transceiver 50' connected to the DSL device 41 by the twisted pair 33 also receives the signal 44. Normally, the signal 44 indicates to a receiving transceiver that the transceiver is producing an unacceptable level of interference and should perform actions to reduce the interference. In this case, however, the receiving transceiver 50' does not recognize the signal 44 because the signal 44 has characteristics, such as for example, a predetermined frequency, that the transceiver 50' is not using to communicate with the DSL device 41. Thus, the signal 44, when received, does not induce a response from the transceiver 50'.

Figure 4:
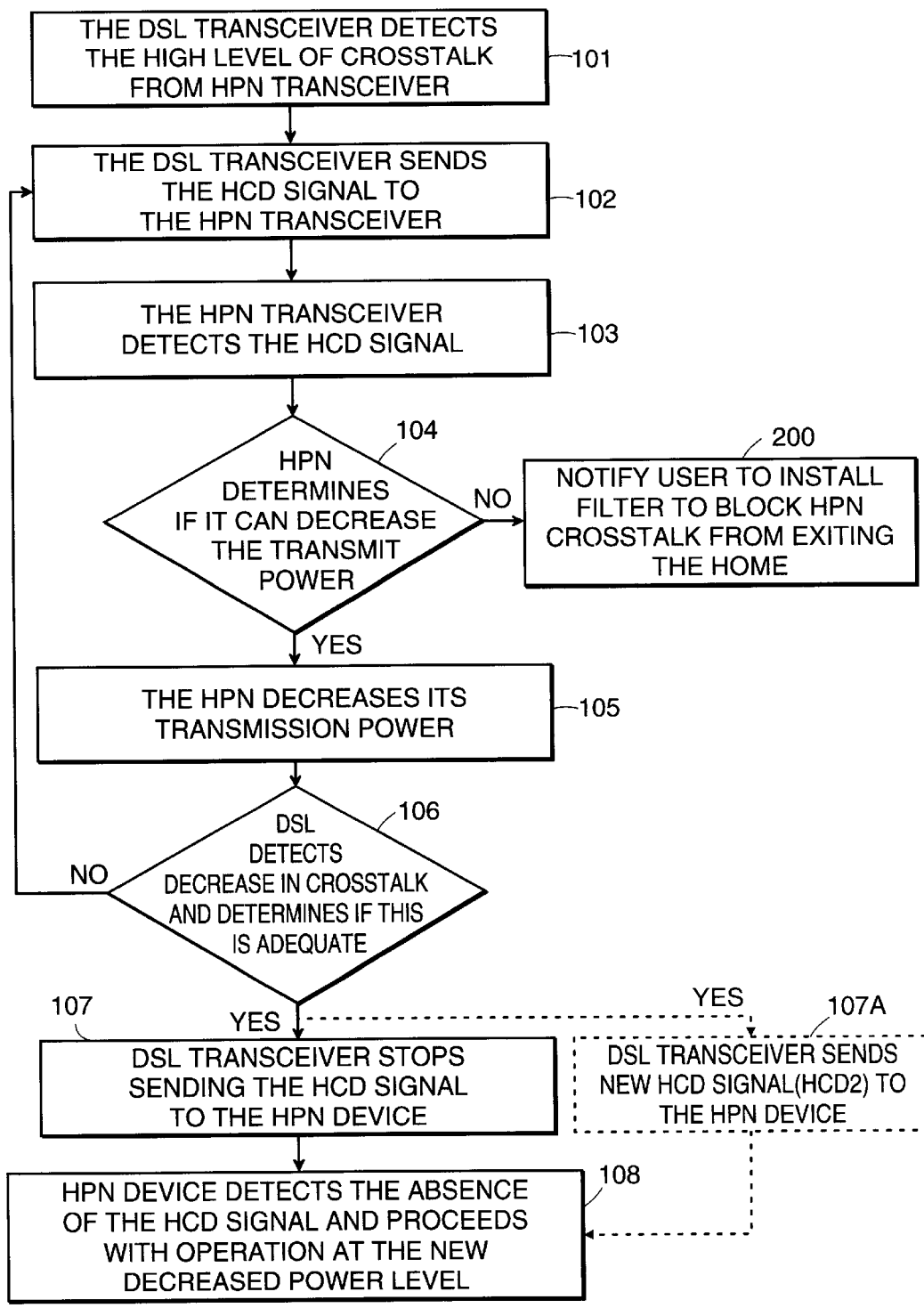
FIG. 4 is a flowchart illustrating an embodiment of a process used by the HPN and DSL transceivers to communicate with electromagnetically coupled signals to request a reduction in the interference.

FIG. 4 is a flow chart illustrating an embodiment of a process used by the HPN transceivers 21 and the DSL device 41 to decrease the crosstalk 31 to an acceptable level (i.e., below the predetermined threshold discussed above). The DSL transceiver 41 first detects (step 101) a high level of crosstalk 31 produced by the HPN transceiver 21. The DSL device 41 determines if the high level is unacceptable based on the predetermined threshold. If the DSL device 41 determines that the crosstalk 31 level is unacceptable, the DSL device 41 sends (step 102) the HCD signal 44 to communicate with the HPN transceivers 21. The HCD signal 44 is electromagnetically coupled onto the twisted pair 32 to form the electromagnetically coupled signal 46 (as described above). The HPN transceiver 21 detects (step 103) the electromagnetically coupled signal 46.

The HPN transceiver 21 then determines (step 104) if the HPN transceiver 21 can take action to adjust the level of crosstalk 31, such as by decreasing the transmission power of the HPN signals 26 transmitted by the HPN transceiver 21. If the HPN transceiver 21 is unable to take an action that has the effect of decreasing or eliminating the crosstalk 31, then the HPN transceiver 21 notifies (step 200) the user of the HPN transceiver 21 that a filter should be installed. Any notification to the user will suffice. For example, the HPN transceiver 21 can display a notification on a user interface on a computer screen to inform the user that the filter is necessary to continue operation of the HPN transceiver 21. The user should install the filter in a position in the home 20 so that the noise produced by all HPN signals 26 is filtered before exiting the home 20. One example of a location for filter installation is a network interface device (NID) point 48 (shown in FIG. 3).

If the HPN transceiver 21 determines that a reduction in the transmission power is possible, then the HPN transceiver 21 reduces (step 105) the transmission power by a predetermined amount (e.g., 2 dB). Each time the HPN transceiver 21 receives the electromagnetically coupled signal 46 and detects that the transmission power can be reduced, the HPN transceiver 21 reduces the transmission power by the predetermined amount. In another embodiment, the amount of reduction is determined based on the level of crosstalk 31 relative to the predetermined threshold.

In another embodiment, the HPN transceiver 21 decreases the level of crosstalk 31 by transmitting the HPN signals 26 at a different frequency. In yet another embodiment, the HPN transceiver 21 decreases the crosstalk 31 level by transmitting the HPN signals 26 at shorter time increments. In a further embodiment, the HPN transceiver 21 decreases the crosstalk 31 level using a combination of the above techniques (e.g. decreasing transmission power, changing the frequency of the HPN signals 26, and transmitting the HPN signals 26 at shorter time increments).

After the HPN device 41 acts to decrease the crosstalk 31 level, the DSL device 41 detects (step 106) the decrease and determines (step 106) if the crosstalk 31 is at an acceptable level. If the crosstalk 31 is at an acceptable level, the DSL device 41 stops transmitting (step 107) the HCD signal 44. By stopping transmission of the HCD signal 44, the HPN transceivers 21 are notified that the adjustment in the transmission power level was sufficient and the HPN transceiver 21 operates (step 108) at the reduced power level.

In another embodiment, when the DSL device 41 determines that the level of crosstalk 31 is acceptable, the DSL device 41 sends (shadow step 107A) a new HCD signal (HCD2) having different characteristics, such as frequency and/or modulation type, than the HCD signal 44. In this case the HPN transceiver 21 detects (step 108) the HCD2 signal and proceeds to operate at the new decreased power level.

If the DSL device 41 determines that the crosstalk 31 is not at an acceptable level, the DSL device 41 repeatedly sends (step 102) the HCD signal 44. The HPN transceiver 21 and the DSL device 41 will repeat the steps listed above (steps 102 through 106) until the DSL device 41 determines that the crosstalk 31 is at an acceptable level.

While the invention has been shown and described with reference to specific preferred embodiments, it should be understood by those skilled in the art that various changes in form and detail may be made therein without departing from the spirit and scope of the invention as defined by the following claims. For example, in other embodiments the DSL device 41 can issue the HCD communication signal 44 for a variety of purposes unrelated to the detection of interference, or in response to detecting other types of interference or disturbance events (i.e., other than crosstalk), without departing from the principles of the invention.

What is claimed is:

1. A method for use by a transceiver to communicate over a wire in a group of wires comprising:

receiving communications over a first wire;

transmitting over the first wire a communication signal that electromagnetically couples to a second wire to produce an electromagnetically coupled signal on the second wire;

conveying a message, by the electromagnetically coupled signal, that induces a response from a second transceiver connected to the second wire;

detecting interference on the second wire due to the communications received over the first wire, wherein the transmitting of the communication signal occurs in response to detecting the interference;

ceasing transmission of the communication signal if the detected interference is below a predetermined threshold; and transmitting a second communication signal over the first wire, in response to detecting that the interference is below the predetermined threshold, to produce a second electromagnetically coupled signal on the second wire that conveys a new message to the second transceiver.

2. The method of claim 1 wherein the second communication signal has a second predefined frequency and a second predefined phase characteristic that are different from a predefined frequency and a predefined phase characteristic of the communication signal.

3. The method of claim 1 wherein the new message conveyed by the second electromagnetically coupled signal indicates to the second transceiver that the interference is below the predetermined threshold.

4. The method of claim 1 wherein the new message conveyed by the second electromagnetically coupled signal indicates to the second transceiver that a filter is needed.

5. A method for use by a transceiver to communicate over a wire in a group of wires comprising:

receiving communications over a first wire;

transmitting over the first wire a communication signal that electromagnetically couples to a second wire to produce an electromagnetically coupled signal on the second wire;

conveying a message, by the electromagnetically coupled signal, that induces a response from a second transceiver connected to the second wire;

detecting interference on the second wire due to the communications received over the first wire, wherein the transmitting of the communication signal occurs in response to detecting the interference; and repeatedly transmitting the communication signal if the detected interference remains above a predetermined threshold.

6. A method for communicating between a first and a second transceiver that are connected to different wires and that are unconnected to each other by any wire in the group of wires, the method comprising:

transmitting signals by a first transceiver over a first wire;

receiving a communication signal over the first wire transmitted from a second transceiver over to a second wire and electromagnetically coupled to the first wire from the second wire;

performing an action in response to a message conveyed by the electromagnetically coupled communication signal, wherein the action is an adjustment to a transmission parameter; and receiving a second electromagnetically coupled signal on the second wire in response to the adjustment.

7. The method of claim 6 further comprising ceasing adjustment of the transmission parameter in response to the second electromagnetically coupled signal.

* * * * *